(12) United States Patent
Krishnagi et al.

(10) Patent No.: US 12,189,757 B2
(45) Date of Patent: Jan. 7, 2025

(54) SYSTEM, METHOD, AND COMPUTER PROGRAM FOR SMART SECRET ROTATOR

(71) Applicant: JPMorgan Chase Bank, N.A., New York, NY (US)

(72) Inventors: Kumar Rao Krishnagi, Powell, OH (US); Vijay Kumar Perla, Westerville, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 246 days.

(21) Appl. No.: 17/983,781

(22) Filed: Nov. 9, 2022

(65) Prior Publication Data
US 2024/0152598 A1 May 9, 2024

(51) Int. Cl.
*G06F 21/45* (2013.01)
*G06F 21/41* (2013.01)

(52) U.S. Cl.
CPC .............. *G06F 21/45* (2013.01); *G06F 21/41* (2013.01)

(58) Field of Classification Search
CPC .. G06F 21/41; G06F 21/45; G06F 2221/2111; H04L 63/0846; H04W 12/63
See application file for complete search history.

(56) References Cited

U.S. PATENT DOCUMENTS

| | | | |
|---|---|---|---|
| 7,950,051 B1* | 5/2011 | Spitz | H04L 63/0846 709/229 |
| 2009/0320108 A1* | 12/2009 | Livingston | H04L 9/0891 726/6 |
| 2016/0191477 A1* | 6/2016 | Kundu | H04L 63/0846 726/6 |
| 2017/0118202 A1* | 4/2017 | Mathew | G06F 21/445 |
| 2021/0334343 A1* | 10/2021 | Asher | H04L 9/3226 |

* cited by examiner

*Primary Examiner* — Daniel B Potratz
(74) *Attorney, Agent, or Firm* — GREENBLUM & BERNSTEIN, P.L.C.

(57) ABSTRACT

Various methods, apparatuses/systems, and media for programmatically generating and rotating secrets for applications to read them to connect to various services are disclosed. A processor determines, in a preconfigured time interval, whether secrets/credentials corresponding to a service provider has been changed; calls a first API to retrieve the changed secrets/credentials from the corresponding service provider; stores the changed secrets/credentials to a corresponding predefined location; causes an application to call a second API to retrieve the changed secret or the credential from the corresponding predefined location; and automatically establishes a connection between the application and the corresponding service provider based on a determination that the changed secrets/credentials retrieved from the predefined location matches with the changed secrets/credentials retrieved from the corresponding service provider during the preconfigured time interval.

20 Claims, 7 Drawing Sheets

600

SYSTEM, METHOD, AND COMPUTER PROGRAM FOR SMART SECRET ROTATOR

TECHNICAL FIELD

This disclosure generally relates to data processing, and, more particularly, to methods and apparatuses for implementing a platform, language, and cloud agnostic smart secret rotator module configured to be run on a scheduler module to retrieve secrets, tokens, passwords, and/or other credentials from different sources and write them to a destination from where applications may read them to connect to various services.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, and competitive analysis, to name but a few. In general, large enterprises, corporations, agencies, institutions, and other organizations are facing a continuing problem of handling, processing, and/or accurately identifying data from various sources and vendor components, and help users/clients via various portals that are crucial to plan actions in an efficient and expedited manner.

For example, Amazon ElastiCache is a fully managed in-memory data store and cache service by Amazon Web Services (AWS). This service may improve the performance of web applications by retrieving information from managed in-memory caches, instead of relying entirely on slower disk-based databases. Amazon Managed Streaming for Apache Kafka (MS K) is another service that may allow secure streaming of data with a fully managed, highly available Apache Kafka service. AWS Secrets Manager is another service that may help in managing, retrieving, and rotating database credentials, API keys, and other secrets throughout their lifecycles. Kubernetes, also known as K8s, is an open-source system for automating deployment, scaling, and management of containerized applications. AWS Elastic Kubernetes Service (EKS) is a managed service and certified Kubernetes conformant to run Kubernetes on AWS and on-premises. However, vendor components deployed in AWS EKS typically experience problem to interact with AWS Services like ElastiCache, MSK, etc., because these vendor components fail to integrate with AWS Secrets Manager.

Thus, there is a need for an advanced tool that can allow these vendor components to consume secrets or credentials to authenticate with, for example, the AWS services.

SUMMARY

The present disclosure, through one or more of its various aspects, embodiments, and/or specific features or sub-components, provides, among other features, various systems, servers, devices, methods, media, programs, and platforms for implementing a platform, language, and cloud agnostic smart secret rotator module configured to be run on a scheduler module to retrieve secrets, tokens, passwords, and/or other credentials from different sources and write them to a destination from where applications may read them to connect to various services, but the disclosure is not limited thereto. For example, the present disclosure, through one or more of its various aspects, embodiments, and/or specific features or sub-components, also provides, among other features, various systems, servers, devices, methods, media, programs, and platforms for implementing a platform, language, and cloud agnostic smart secret rotator module configured to provide: seamless integration with vendor products which does not support AWS Secrets manager; rotate secrets, tokens, passwords, and/or other credentials on a scheduled manner; speed up AWS deployments; and save developing hours for vendors, etc., but the disclosure is not limited thereto.

According to exemplary embodiments, a method for implementing a smart secret rotator module configured to programmatically generate and rotate secrets or credentials for applications to read them to connect to various services by utilizing one or more processors along with allocated memory is disclosed. The method may include: establishing a communication link between a plurality of service providers and one or more processors embedded within the smart secret rotator module via a communication interface, wherein each of said plurality of service providers generates corresponding secret or credential to be utilized by an application for connecting to said service; running the smart secret rotator module in a preconfigured time interval to determine whether the secret or the credential corresponding to each service provider has been changed during the preconfigured time interval; calling, by the smart secret rotator module, a first application programming interface (API), in response to determining that the secret or the credential corresponding to each service provider has been changed, to retrieve the changed secret or the credential from the corresponding service provider; storing the changed secret or the credential to a corresponding predefined location; calling, by the application, a second API to retrieve the changed secret or the credential from the corresponding predefined location; and automatically establishing a connection between the application and the corresponding service provider based on a determination that the changed secret or the credential retrieved from the predefined location matches with the changed secret or the credential retrieved from the corresponding service provider during the preconfigured time interval.

According to exemplary embodiments, the plurality of services may include one or more of the following: a private or a public cloud provider; an active directory federation service configured to provide a user with a single sign-on access to systems and applications located across organizational boundaries; and a password vault configured to store usernames and passwords for multiple applications securely, and in an encrypted format, but the disclosure is not limited thereto.

According to exemplary embodiments, the private cloud provider may include one or more of the following: Amazon Web Services secret manager; Azure key vault; and Google secret manager, but the disclosure is not limited thereto.

According to exemplary embodiments, the preconfigured time interval may include five minutes, or ten minutes, or fifteen minutes, or twenty minutes, but the disclosure is not limited thereto.

According to exemplary embodiments, the predefined location may include one or more of the following: Kubernetes secret; configuration files; a centralized memory; and a centralized database, but the disclosure is not limited thereto.

According to exemplary embodiments, the secret or the credential may include one or more of the following: secret keys, access codes, authorization tokens, and passwords, but the disclosure is not limited thereto.

According to exemplary embodiments, the smart secret rotator module may be configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

According to exemplary embodiments, when a cloud service is enabled with secret rotation while provisioning, the method may further include: transmitting those rotation notifications to the smart secret rotator module via lambda functions; and updating the corresponding predefined location with the secrets accordingly.

According to exemplary embodiments, a system for implementing a smart secret rotator module configured to programmatically generate and rotate secrets or credentials for applications to read them to connect to various services is disclosed. The system may include a processor; and a memory operatively connected to the processor via a communication interface, the memory storing computer readable instructions, when executed, may cause the processor to: establish a communication link between a plurality of service providers and one or more processors embedded within the smart secret rotator module via a communication interface, wherein each of said plurality of service providers generates corresponding secret or credential to be utilized by an application for connecting to said service; run the smart secret rotator module in a preconfigured time interval to determine whether the secret or the credential corresponding to each service provider has been changed during the preconfigured time interval; call, by the smart secret rotator module, a first application programming interface (API), in response to determining that the secret or the credential corresponding to each service provider has been changed, to retrieve the changed secret or the credential from the corresponding service provider; store the changed secret or the credential to a corresponding predefined location; call, by the application, a second API to retrieve the changed secret or the credential from the corresponding predefined location; and automatically establish a connection between the application and the corresponding service provider based on a determination that the changed secret or the credential retrieved from the predefined location matches with the changed secret or the credential retrieved from the corresponding service provider during the preconfigured time interval.

According to exemplary embodiments, the secret or the credential may include one or more of the following: secret keys, access codes, authorization tokens, and passwords, wherein the smart secret rotator module may be configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

According to exemplary embodiments, when a cloud service is enabled with secret rotation while provisioning, the processor may be further configured to: transmit those rotation notifications to the smart secret rotator module via lambda functions; and update the corresponding predefined location with the secrets accordingly.

According to exemplary embodiments, a non-transitory computer readable medium configured to store instructions for implementing a smart secret rotator module configured to programmatically generate and rotate secrets or credentials for applications to read them to connect to various services is disclosed. The instructions, when executed, may cause a processor to perform the following: establishing a communication link between a plurality of service providers and one or more processors embedded within the smart secret rotator module via a communication interface, wherein each of said plurality of service providers generates corresponding secret or credential to be utilized by an application for connecting to said service; running the smart secret rotator module in a preconfigured time interval to determine whether the secret or the credential corresponding to each service provider has been changed during the preconfigured time interval; calling, by the smart secret rotator module, a first application programming interface (API), in response to determining that the secret or the credential corresponding to each service provider has been changed, to retrieve the changed secret or the credential from the corresponding service provider; storing the changed secret or the credential to a corresponding predefined location; calling, by the application, a second API to retrieve the changed secret or the credential from the corresponding predefined location; and automatically establishing a connection between the application and the corresponding service provider based on a determination that the changed secret or the credential retrieved from the predefined location matches with the changed secret or the credential retrieved from the corresponding service provider during the preconfigured time interval.

According to exemplary embodiments, when a cloud service is enabled with secret rotation while provisioning, the instructions, when executed, may further cause the processor to perform the following: transmitting those rotation notifications to the smart secret rotator module via lambda functions; and updating the corresponding predefined location with the secrets accordingly.

According to exemplary embodiments, when a cloud service is enabled with secret rotation while provisioning, the instructions, when executed, may further cause the processor to perform the following: transmitting those rotation notifications to the smart secret rotator module via lambda functions; and updating the corresponding predefined location with the secrets accordingly.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
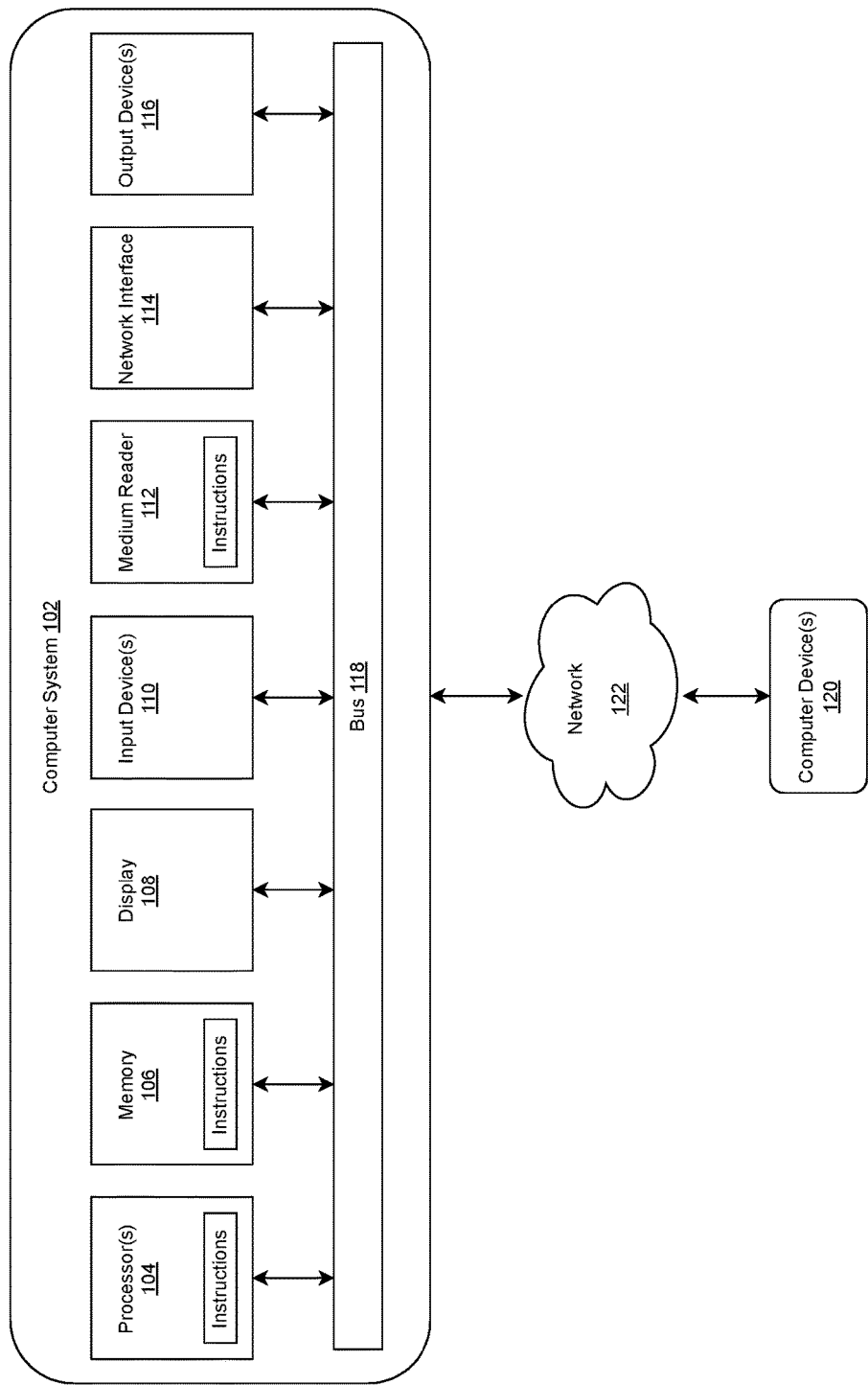
FIG. 1 illustrates a computer system for implementing a platform, language, and cloud agnostic smart secret rotator module configured to be run on a scheduler module to retrieve secrets, tokens, passwords, and/or other credentials from different sources and write them to a destination from where applications may read them to connect to various services in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, and cloud agnostic smart secret rotator module configured to be run on a scheduler module to retrieve secrets, tokens, passwords, and/or other credentials from different sources and write them to a destination from where applications may read them to connect to various services in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the smart secret rotator module may be platform, language, and cloud agnostic that may allow for consistent easy orchestration and passing of data through various components to output a desired result regardless of platform, language, and cloud environment. Since the disclosed process, according to exemplary embodiments, is platform, language, and cloud agnostic, the smart secret rotator module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
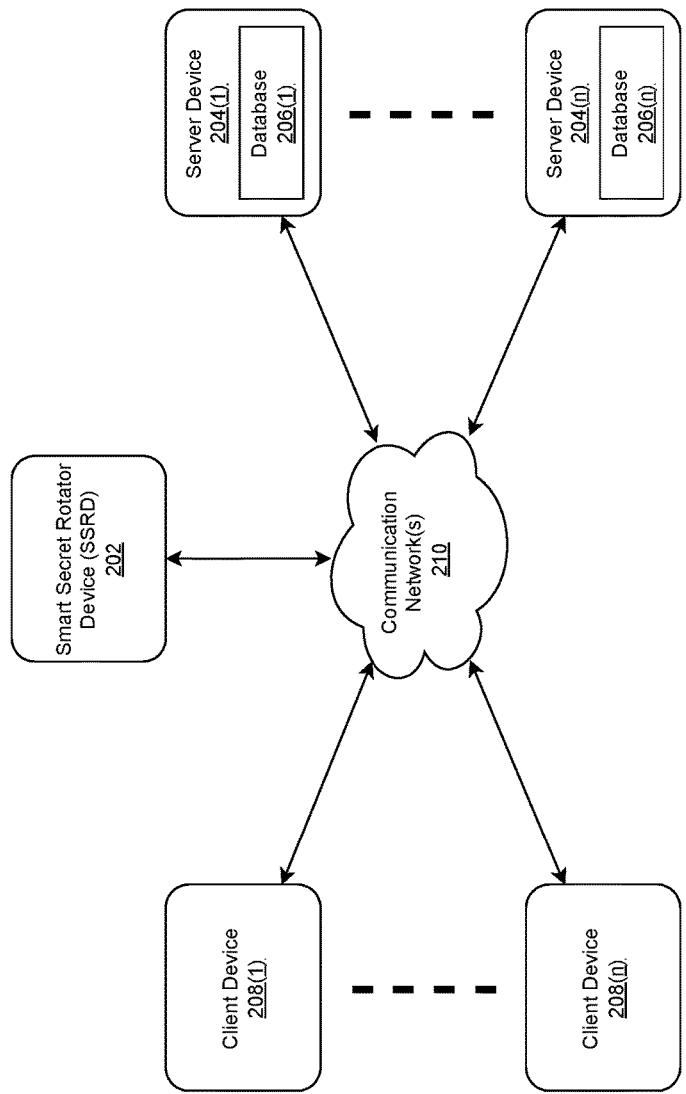
FIG. 2 illustrates an exemplary diagram of a network environment with a platform, language, and cloud agnostic smart secret rotator device in accordance with an exemplary embodiment.

Referring to FIG. 2, a schematic of an exemplary network environment 200 for implementing a language, platform, and cloud agnostic smart secret rotator device (SSRD) of the instant disclosure is illustrated.

According to exemplary embodiments, the above-described problems associated with conventional tools may be overcome by implementing an SSRD 202 as illustrated in FIG. 2 that may be configured for implementing a platform, language, and cloud agnostic smart secret rotator module configured to be run on a scheduler module to retrieve secrets, tokens, passwords, and/or other credentials from different sources and write them to a destination from where applications may read them to connect to various services, but the disclosure is not limited thereto. For example, the above-described problems associated with conventional tools may be overcome by implementing the SSRD 202 as illustrated in FIG. 2 that may be configured to provide: seamless integration with vendor products which does not support AWS Secrets manager; rotate secrets, tokens, passwords, and/or other credentials on a scheduled manner; speed up AWS deployments; and save developing hours for vendors, etc., but the disclosure is not limited thereto.

The SSRD 202 may be the same or similar to the computer system 102 as described with respect to FIG. 1.

The SSRD 202 may store one or more applications that can include executable instructions that, when executed by the SSRD 202, cause the SSRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSRD 202 itself, may be located in virtual server(s) running in a cloud-based computing environment rather than being tied to one or more specific physical network computing devices. Also, the application(s) may be running in one or more virtual machines (VMs) executing on the SSRD 202. Additionally, in one or more embodiments of this technology, virtual machine(s) running on the SSRD 202 may be managed or supervised by a hypervisor.

In the network environment 200 of FIG. 2, the SSRD 202 is coupled to a plurality of server devices 204(1)-204(n) that hosts a plurality of databases 206(1)-206(n), and also to a plurality of client devices 208(1)-208(n) via communication network(s) 210. A communication interface of the SSRD 202, such as the network interface 114 of the computer system 102 of FIG. 1, operatively couples and communicates between the SSRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSRD 202 may be a standalone device or integrated with one or more other devices or apparatuses, such as one or more of the server devices 204(1)-204(n), for example. In one particular example, the SSRD 202 may be hosted by one of the server devices 204(1)-204(n), and other arrangements are also possible. Moreover, one or more of the devices of the SSRD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSRD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SSRD 202 that may efficiently provide a platform for implementing a platform, language, and cloud agnostic smart secret rotator module configured to be run on a scheduler module to retrieve secrets, tokens, passwords, and/or other credentials from different sources and write them to a destination from where applications may read them to connect to various services, but the disclosure is not limited thereto. For example, according to exemplary embodiments, the client devices 208(1)-208(n) in this example may include any type of computing device that can facilitate the implementation of the SSRD 202 that may efficiently provide a platform for implementing a platform, language, and cloud agnostic smart secret rotator module configured to provide: seamless integration with vendor products which does not support AWS Secrets manager; rotate secrets, tokens, passwords, and/or other credentials on a scheduled manner; speed up AWS deployments; and save developing hours for vendors, etc., but the disclosure is not limited thereto.

The client devices 208(1)-208(n) may run interface applications, such as standard web browsers or standalone client applications, which may provide an interface to communicate with the SSRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SSRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SSRD 202, the server devices 204(1)-204(n), or the client devices 208(1)-208(n), for example, may be configured to operate as virtual instances on the same physical machine. For example, one or more of the SSRD 202, the server devices 204(1)-204(n), or the client devices 208(1)-208(n) may operate on the same physical device rather than as separate devices communicating through communication network(s) 210. Additionally, there may be more or fewer SSRDs 202, server devices 204(1)-204(n), or client devices 208(1)-208(n) than illustrated in FIG. 2. According to exemplary embodiments, the SSRD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
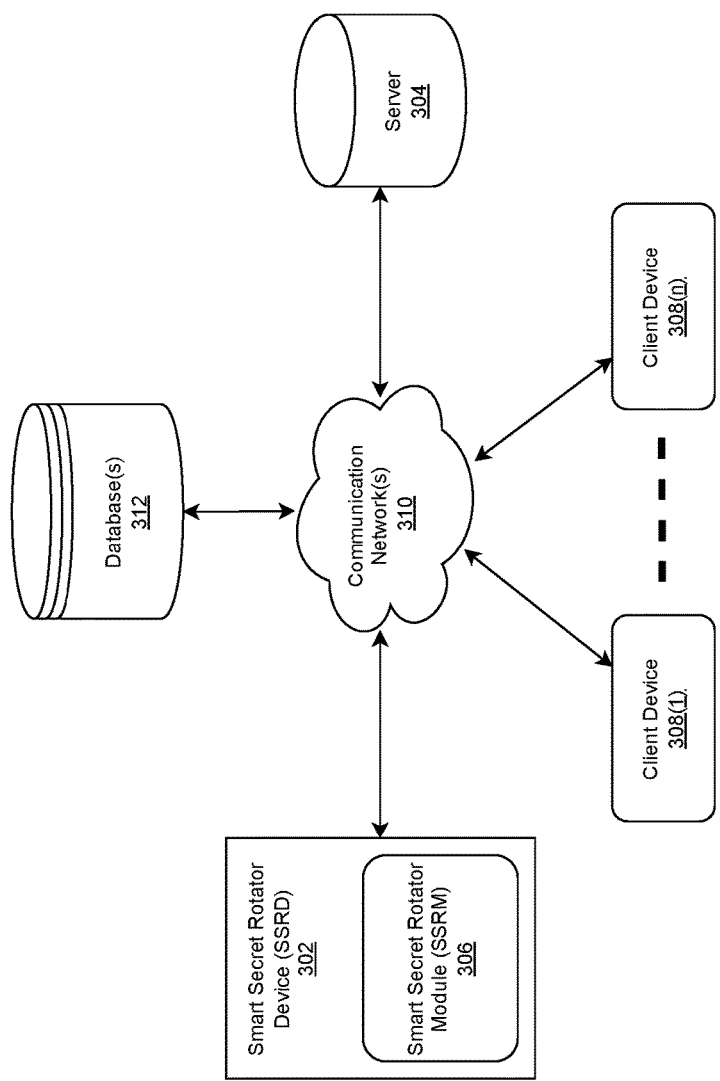
FIG. 3 illustrates a system diagram for implementing a platform, language, and cloud agnostic smart secret rotator device having a platform, language, and cloud agnostic smart secret rotator module in accordance with an exemplary embodiment.

FIG. 3 illustrates a system diagram for implementing a platform, language, and cloud agnostic SSRD having a platform, language, and cloud agnostic smart secret rotator module (SSRM) in accordance with an exemplary embodiment.

As illustrated in FIG. 3, the system 300 may include a SSRD 302 within which an SSRM 306 is embedded, a server 304, a database(s) 312, a plurality of client devices 308(1) . . . 308(n), and a communication network 310.

According to exemplary embodiments, the SSRD 302 including the SSRM 306 may be connected to the server 304, and the database(s) 312 via the communication network 310. The SSRD 302 may also be connected to the plurality of client devices 308(1) . . . 308(n) via the communication network 310, but the disclosure is not limited thereto.

According to exemplary embodiment, the SSRD 302 is described and shown in FIG. 3 as including the SSRM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SSRM 306 may be configured to receive real-time feed of data from the plurality of client devices 308(1) . . . 308(n) and secondary sources via the communication network 310.

As may be described below, the SSRM 306 may be configured to: establish a communication link between a plurality of service providers and one or more processors embedded within the smart secret rotator module via a communication interface, wherein each of said plurality of service providers generates corresponding secret or credential to be utilized by an application for connecting to said service; run the smart secret rotator module in a preconfigured time interval to determine whether the secret or the credential corresponding to each service provider has been changed during the preconfigured time interval; call, by the smart secret rotator module, a first application programming interface (API), in response to determining that the secret or the credential corresponding to each service provider has been changed, to retrieve the changed secret or the credential from the corresponding service provider; store the changed secret or the credential to a corresponding predefined location; call, by the application, a second API to retrieve the changed secret or the credential from the corresponding predefined location; and automatically establish a connection between the application and the corresponding service provider based on a determination that the changed secret or the credential retrieved from the predefined location matches with the changed secret or the credential retrieved from the corresponding service provider during the preconfigured time interval, but the disclosure is not limited thereto.

The plurality of client devices 308(1) . . . 308(n) are illustrated as being in communication with the SSRD 302. In this regard, the plurality of client devices 308(1) . . . 308(n) may be "clients" (e.g., customers) of the SSRD 302 and are described herein as such. Nevertheless, it is to be known and understood that the plurality of client devices 308(1) . . . 308(n) need not necessarily be "clients" of the SSRD 302, or any entity described in association therewith herein. Any additional or alternative relationship may exist between either or both of the plurality of client devices 308(1) . . . 308(n) and the SSRD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SSRD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SSRD 302 may be the same or similar to the SSRD 202 as described with respect to FIG. 2, including any features or combination of features described with respect thereto.

Figure 4:
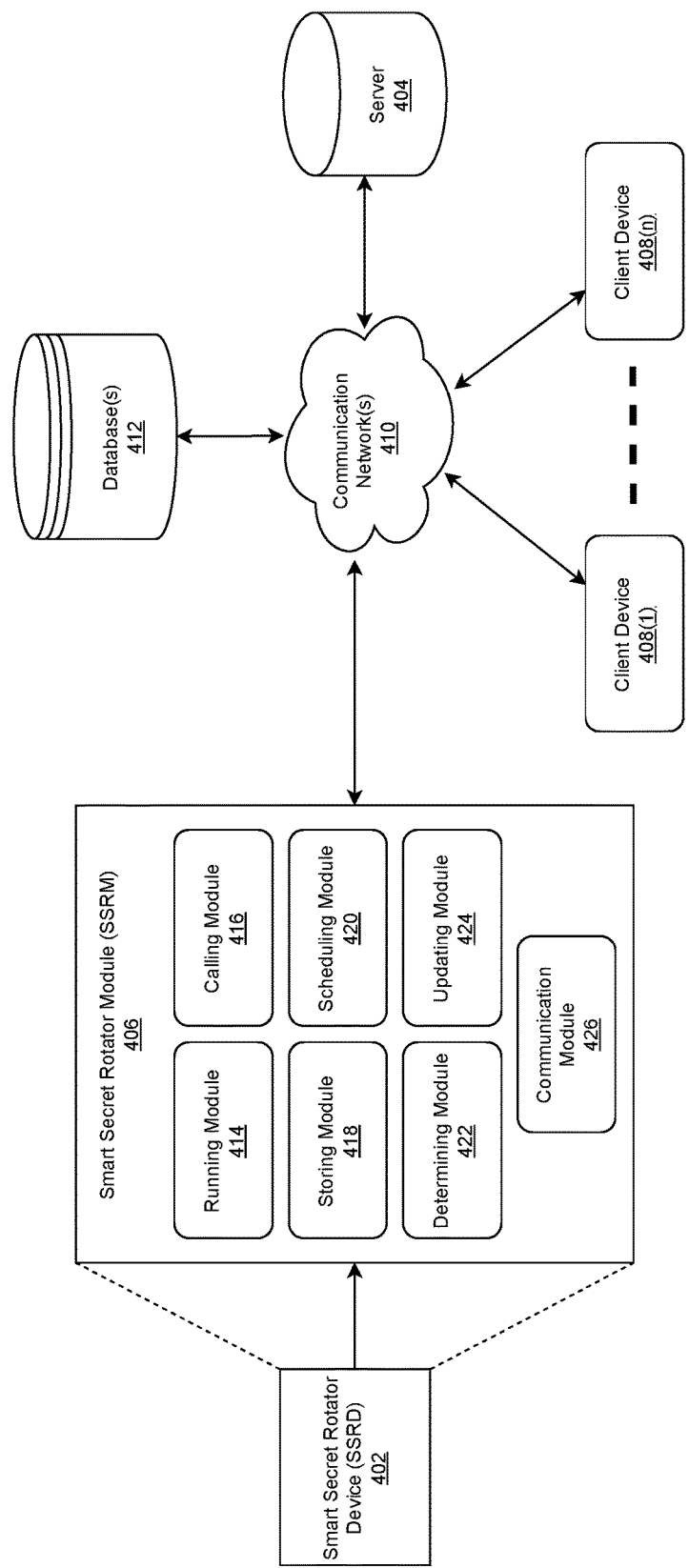
FIG. 4 illustrates a system diagram for implementing a platform, language, and cloud agnostic smart secret rotator module of FIG. 3 in accordance with an exemplary embodiment.

FIG. 4 illustrates a system diagram for implementing a platform, language, and cloud agnostic SSRM of FIG. 3 in accordance with an exemplary embodiment.

According to exemplary embodiments, the system 400 may include a platform, language, and cloud agnostic SSRD 402 within which a platform, language, and cloud agnostic SSRM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the SSRD 402 including the SSRM 406 may be connected to the server 404 and the database(s) 412 via the communication network 410. The SSRD 402 may also be connected to the plurality of client devices 408(1)-408(n) via the communication network 410, but the disclosure is not limited thereto. The SSRM 406, the server 404, the plurality of client devices 408(1)-408(n), the database(s) 412, the communication network 410 as illustrated in FIG. 4 may be the same or similar to the SSRM 306, the server 304, the plurality of client devices 308(1)-308(n), the database(s) 312, the communication network 310, respectively, as illustrated in FIG. 3.

According to exemplary embodiments, as illustrated in FIG. 4, the SSRM 406 may include a running module 414, a calling module 416, a storing module 418, a scheduling module 420, a determining module 422, an updating module 424, and a communication module 426. According to exemplary embodiments, interactions and data exchange among these modules included in the SSRM 406 provide the advantageous effects of the disclosed invention. Functionalities of each module of FIG. 4 may be described in detail below with reference to FIGS. 4-7.

According to exemplary embodiments, each of the running module 414, calling module 416, storing module 418, scheduling module 420, determining module 422, updating module 424, and the communication module 426 of the SSRM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the running module 414, calling module 416, storing module 418, scheduling module 420, determining module 422, updating module 424, and the communication module 426 of the SSRM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the running module 414, calling module 416, storing module 418, scheduling module 420, determining module 422, updating module 424, and the communication module 426 of the SSRM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the running module 414, calling module 416, storing module 418, scheduling module 420, determining module 422, updating module 424, and the communication module 426 of the SSRM 406 of FIG. 4 may be called via corresponding API.

According to exemplary embodiments, the process implemented by the SSRM 406 may be executed via the communication module 426 and the communication network 410, which may comprise plural networks as described above. For example, in an exemplary embodiment, the various components of the SSRM 406 may communicate with the server 404, and the database(s) 412 via the communication module 426 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
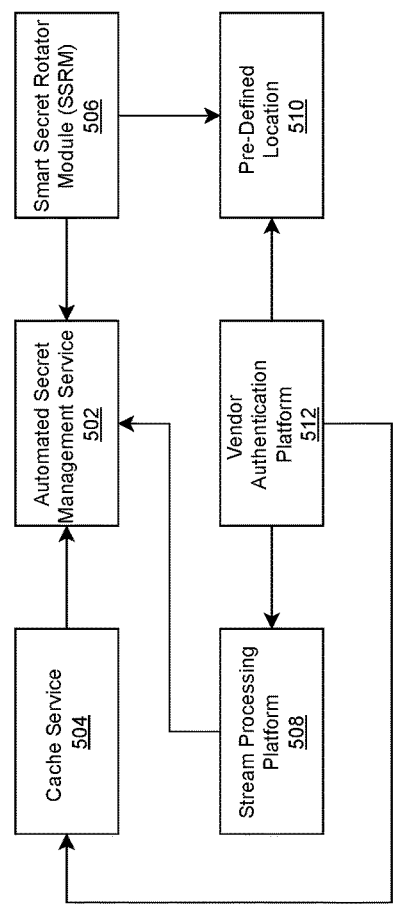
FIG. 5 illustrates an exemplary architecture diagram implemented by the platform, language, and cloud agnostic smart secret rotator module of FIG. 4 in accordance with an exemplary embodiment.

FIG. 5 illustrates an exemplary architecture diagram 500 implemented by the platform, language, and cloud agnostic SSRM 406 of FIG. 4 in accordance with an exemplary embodiment. As illustrated in the exemplary architecture diagram 500 of FIG. 5, an automated secret management service 502 may be operatively connected to a cache service 504, an SSRM 506, and a stream processing platform 508. As illustrated in the exemplary architecture diagram 500 of FIG. 5, a vendor authentication platform (or simply an "application") 512 may be operatively connected to the stream processing platform 508 and a predefined location 510. The predefined location 510 may receive data from the SSRM 506. The SSRM 506 may be the same or similar to the SSRM 406 as illustrated in FIG. 4.

According to exemplary embodiments, the cache service 504 may include an elastic cache service that may be a fully managed in-memory data store and cache service by AWS, but the disclosure is not limited thereto. The cache service 504, according to exemplary embodiments, improves the performance of web applications, i.e., the vendor authentication platform 512 by retrieving information from managed in-memory caches, instead of relying entirely on slower disk-based databases.

According to exemplary embodiments, the stream processing platform 508 may include an AWS MSK. The AWS MSK is an Amazon managed streaming for Apache Kafka (MS K) service that may allow secure streaming of data with a fully managed, highly available Apache Kafka service. The automated secret management service 502 may include an AWS secret manger configured to securely encrypt and centrally audit secrets such as database credentials and API keys; manage access to secrets using fine-grained AWS Identity and Access Management (IAM) and resource-based policies; rotate secrets automatically to meet security and compliance requirements; replicate secrets to support disaster recovery scenarios and multi-region applications, etc.

Vendor components, i.e., the vendor authentication platform 512 deployed in AWS EKS may experience issues to interact with AWS Services like Elasticache, MSK, etc., as it doesn't integrate with AWS Secrets Manager. These components need a way to consume secrets/credentials to authenticate with AWS services. According to exemplary embodiments, as illustrated in FIG. 5, the SSRM 506 may be configured to build a reusable plug and play solution to make secrets or credentials available to vendor components. For example, the SSRM 506 may extract secret from automated secret management service 502 (i.e., AWS secret manager) and generate Kubernetes secrets in EKS; rotate secret every preconfigured time (i.e., every 10 minutes). The vendor authentication platform 512 where vendor components are deployed can consume the refreshed secret for every new connection with the stream processing platform 508 and the cache service 504.

For example, as illustrated in FIG. 5, the automated secret management service 502 may receive secrets created by the cache service 504 and the stream processing platform 508 during build using terraform. Terraform is an open-source, infrastructure as code, software tool where users define and provide data center infrastructure using a declarative configuration language known as HashiCorp Configuration Language, or optionally JSON. The SSRM 506 then extract the secrets (i.e., tokens) in every 10 minutes and updates the tokens in Kubernetes. The updated tokens may include Kubernetes secret, elastic token, and MSK token, but the disclosure is not limited thereto. The vendor authentication platform 512 may then read the updated tokens and connect to the stream processing platform 508 (i.e., MSK) using the MSK token and/or connect to the cache service 504 (i.e., Elastic cache) using the elastic token. Thus, according to exemplary embodiments, the SSRM 506 provides seamless integration with vendor products which does not support AWS Secrets manager; speeds up AWS deployments; and saves developing hours for vendors.

Figure 6:
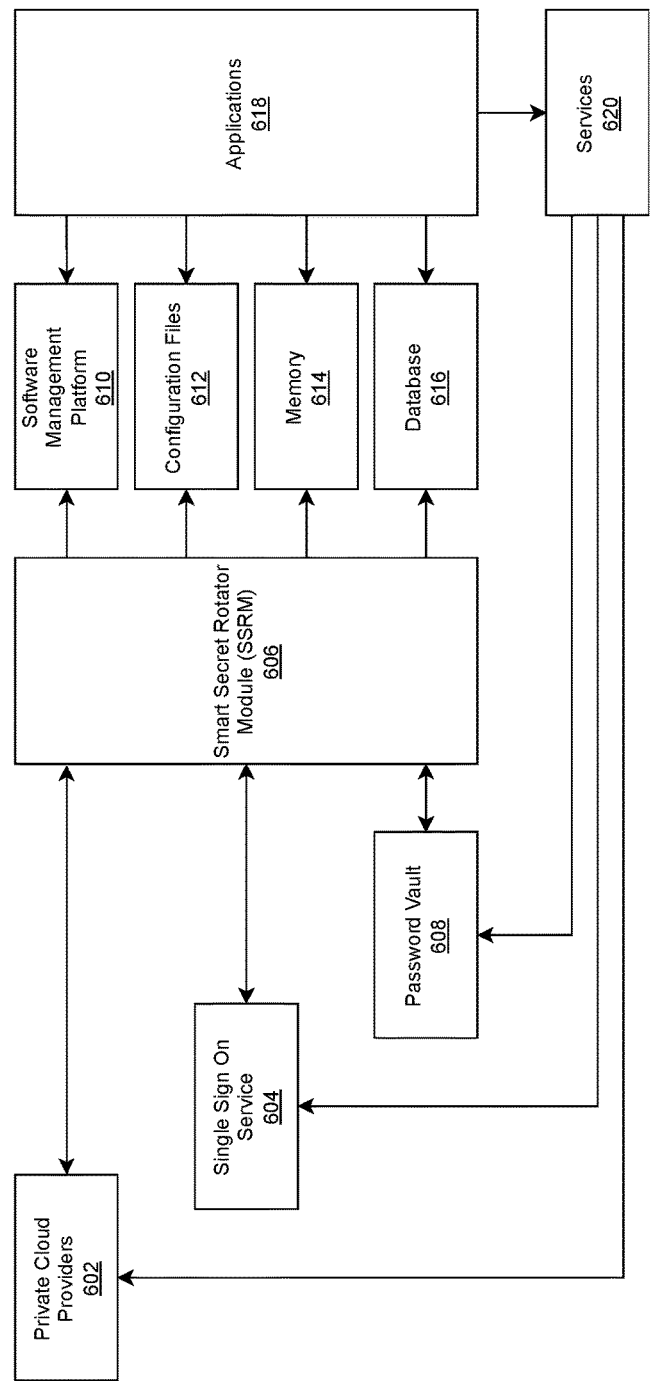
FIG. 6 illustrates another exemplary architecture diagram implemented by the platform, language, and cloud agnostic smart secret rotator module of FIG. 4 in accordance with an exemplary embodiment.

FIG. 6 illustrates another exemplary architecture diagram 600 implemented by the platform, language, and cloud agnostic SSRM 406 of FIG. 4 in accordance with an exemplary embodiment. As illustrated in FIG. 6, an SSRM 606, which may be the same or similar to the SSRM 406 as illustrated in FIG. 4, may be operatively connected, on one side, to a plurality of private cloud providers 602, a single sign on service 604, and a password vault 608, and on another side, to a software management platform 610, configuration files 612, a memory 614, and a database 616. The database 616 may be the same or similar to the database 412 as illustrated in FIG. 4. A plurality of applications 618 (i.e., vendor components) may be operatively connected, on one side, to a software management platform 610, configuration files 612, a memory 614, and a database 616, on another side, to a plurality of services 620 provided by a plurality of service providers, i.e., a plurality of private cloud providers 602, a single sign on service 604, and a password vault 608, but the disclosure is not limited thereto.

According to exemplary embodiments, the private cloud providers 602 may include AWS secret manager, Azure key vault, Google secret manager, etc., but the disclosure is not limited thereto. The single sign on service 604 may include an Active Directory Federation Services (ADFS) which is a software component developed by Microsoft, and can run on Windows Server operating systems to provide users with single sign-on access to systems and applications located across organizational boundaries. The software management platform 610 may include Kubernetes secret. The plurality of services 620 may include Kafka, Elastic cache, databases, S3, etc., but the disclosure is not limited thereto.

As illustrated in FIG. 6, the SSRM 606 may be configured as a reusable component which can be deployed to any cloud platform to retrieve secrets/tokens/passwords and write it to a destination from where applications can read them to connect to various services like Elasticache, database, S3 etc. According to exemplary embodiments, SSRM 606 runs on a scheduler module (i.e., scheduling module 420) to retrieve secrets/tokens/passwords/keys from different sources, such as the private cloud providers 602, single sign on service 604, password vaults 608 (i.e., EPV/NGV/Azure). The SSRM 406 then write the retrieved secrets/tokens/passwords/keys to the software management platform 610, configuration files 612, memory 612, and database 616. The applications 618 may then read the secrets/tokens/passwords/keys and connect to the services 620 using the secrets/tokens/passwords/keys. Thus, according to exemplary embodiments, the SSRM 606 provides seamless integration with vendor products (i.e., applications 618) which does not support AWS Secrets manager; speeds up AWS deployments; and saves developing hours for vendors.

Further details of an exemplary embodiment will be provided below referring to FIGS. 4-6.

According to exemplary embodiments, the communication module 426 may be configured to establish a communication link between a plurality of service providers and one or more processors embedded within the SSRM 406, 506, 606 via a communication interface. Each of the plurality of service providers, i.e., cache service 504, stream processing platform 508, private cloud providers 602, single sign on service 604, password vault 608, etc., generates corresponding secret or credential to be utilized by an application (i.e., vendor authentication platform 512, applications 618) for connecting to the service.

According to exemplary embodiments, the running module 414 may be configured to run the SSRM 406, 506, 606 in a preconfigured time interval to determine whether the secret or the credential corresponding to each service provider has been changed during the preconfigured time interval. The calling module 416 may be configured to call, by the SSRM 406, 506, 606, a first API, in response to determining by the determining module 422 that the secret or the credential corresponding to each service provider has been changed, to retrieve the changed secret or the credential from the corresponding service provider (i.e., cache service 504, stream processing platform 508, private cloud providers 602, single sign on service 604, password vault 608, etc.). The storing module 418 may be configured to store the changed secret or the credential to a corresponding predefined location. The calling module 416 may be configured to call, by the application (i.e., vendor authentication platform 512, applications 618), a second API to retrieve the changed secret or the credential from the corresponding predefined location 510.

According to exemplary embodiments, the communication module 426 may be further configured to automatically establish a connection between the application (i.e., vendor authentication platform 512, applications 618) and the corresponding service provider (i.e., cache service 504, stream processing platform 508, private cloud providers 602, single sign on service 604, password vault 608, etc.) based on a determination that the changed secret or the credential retrieved from the predefined location 510 matches with the changed secret or the credential retrieved from the corresponding service provider during the preconfigured time interval.

According to exemplary embodiments, the preconfigured time interval may include five minutes, or ten minutes, or fifteen minutes, or twenty minutes, but the disclosure is not limited thereto.

According to exemplary embodiments, the predefined location 510 may include one or more of the following: software management platform 610 (i.e., Kubernetes secret); configuration files 612; a centralized memory (i.e., memory 614); and a centralized database (i.e., database 616), but the disclosure is not limited thereto.

According to exemplary embodiments, the secret or the credential may include one or more of the following: secret keys, access codes, authorization tokens, and passwords, but the disclosure is not limited thereto.

According to exemplary embodiments, the SSRM 406, 506, 606 may be configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

According to exemplary embodiments, when a cloud service is enabled with secret rotation while provisioning, the communication module 426 may be further configured to transmit those rotation notifications to the SSRM 406, 506, 606 via lambda functions; and the updating module 424 may be configured to update the corresponding predefined location (i.e., predefined location 510) with the secrets accordingly.

Figure 7:
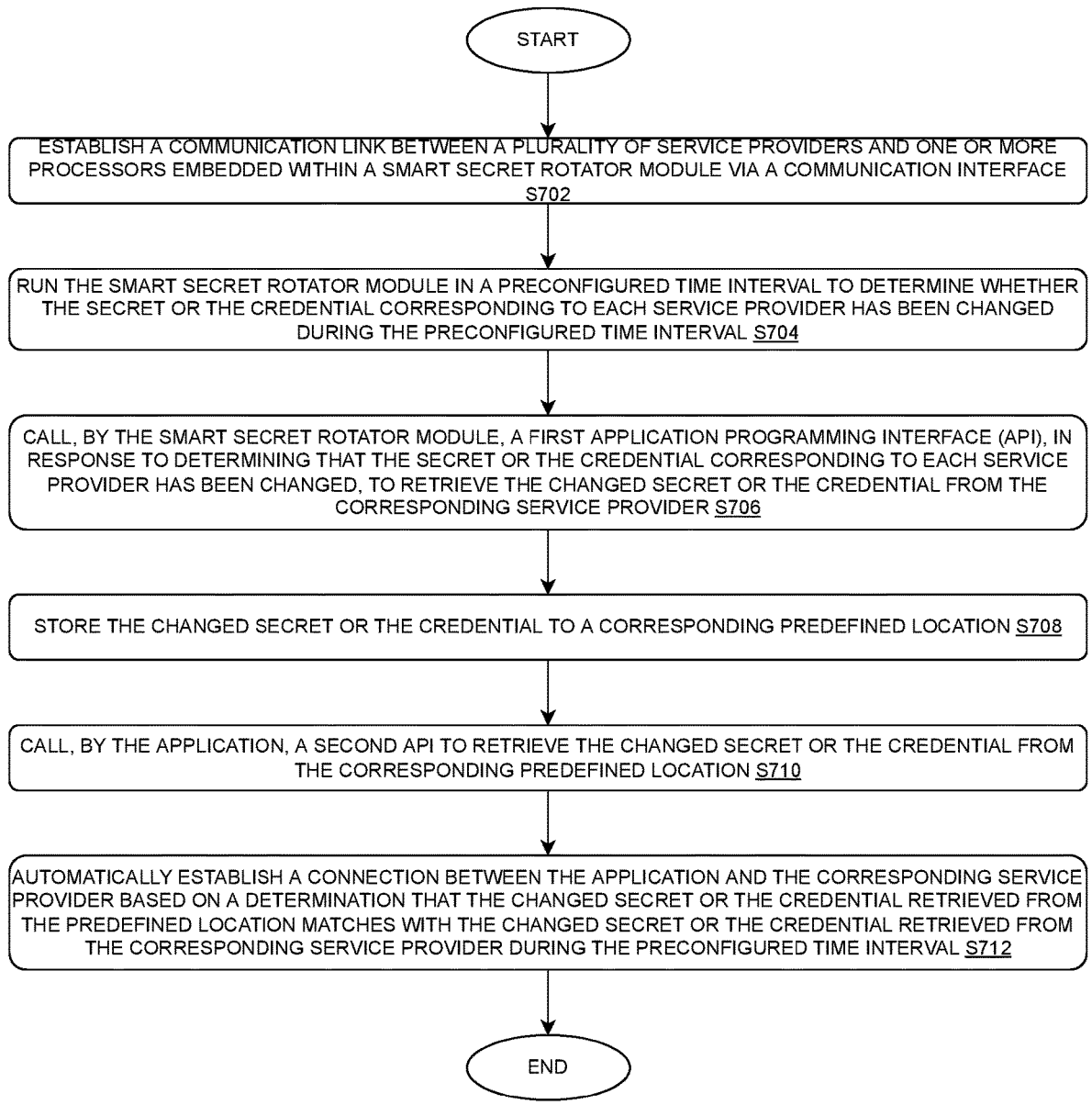
FIG. 7 illustrates an exemplary flow chart implemented by the platform, language, and cloud agnostic smart secret rotator module of FIG. 4 for retrieving secrets, tokens, passwords, and/or other credentials from different sources and writing them to a destination from where applications may read them to connect to various services in accordance with an exemplary embodiment.

FIG. 7 illustrates an exemplary flow chart 700 implemented by the platform, language, and cloud agnostic SSRM 407 of FIG. 4 for retrieving secrets, tokens, passwords, and/or other credentials from different sources and writing them to a destination from where applications may read them to connect to various services in accordance with an exemplary embodiment. It may be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include establishing a communication link between a plurality of service providers and one or more processors embedded within the smart secret rotator module via a communication interface, wherein each of said plurality of service providers generates corresponding secret or credential to be utilized by an application for connecting to said service.

At step S704, the process 700 may include running the smart secret rotator module in a preconfigured time interval to determine whether the secret or the credential corresponding to each service provider has been changed during the preconfigured time interval.

At step S706, the process 700 may include calling, by the smart secret rotator module, a first application programming interface (API), in response to determining that the secret or the credential corresponding to each service provider has been changed, to retrieve the changed secret or the credential from the corresponding service provider.

At step S708, the process 700 may include storing the changed secret or the credential to a corresponding predefined location.

At step S710, the process 700 may include calling, by the application, a second API to retrieve the changed secret or the credential from the corresponding predefined location.

At step S712, the process 700 may include receiving, based on the new TCP connection, a response from the connected TPS or the sibling SATPG.

At step S714, the process 700 may include automatically establishing a connection between the application and the corresponding service provider based on a determination that the changed secret or the credential retrieved from the predefined location matches with the changed secret or the credential retrieved from the corresponding service provider during the preconfigured time interval.

According to exemplary embodiments, in the process 700, the plurality of services may include one or more of the following: a private or a public cloud provider; an active directory federation service configured to provide a user with a single sign-on access to systems and applications located across organizational boundaries; and a password vault configured to store usernames and passwords for multiple applications securely, and in an encrypted format, but the disclosure is not limited thereto.

According to exemplary embodiments, in the process 700, the private cloud provider may include one or more of the following: Amazon Web Services secret manager; Azure key vault; and Google secret manager, but the disclosure is not limited thereto.

According to exemplary embodiments, in the process 700, the preconfigured time interval may include five minutes, or ten minutes, or fifteen minutes, or twenty minutes, but the disclosure is not limited thereto.

According to exemplary embodiments, in the process 700, the predefined location may include one or more of the following: Kubernetes secret; configuration files; a centralized memory; and a centralized database, but the disclosure is not limited thereto.

According to exemplary embodiments, in the process 700, the secret or the credential may include one or more of the following: secret keys, access codes, authorization tokens, and passwords, but the disclosure is not limited thereto.

According to exemplary embodiments, in the process 700, the smart secret rotator module may be configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

According to exemplary embodiments, when a cloud service is enabled with secret rotation while provisioning, the process 700 may further include: transmitting those rotation notifications to the smart secret rotator module via lambda functions; and updating the corresponding predefined location with the secrets accordingly.

According to exemplary embodiments, the SSRD 402 may include a memory (e.g., a memory 106 as illustrated in FIG. 1) which may be a non-transitory computer readable medium that may be configured to store instructions for implementing a platform, language, and cloud agnostic SSRM 406, 506, 606 for programmatically generating and rotating secrets or credentials for applications to read them to connect to various services as disclosed herein. The SSRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SSRM 406, 506, 606, or within the SSRD 402, may be used to perform one or more of the methods and processes as described herein. In a particular embodiment, the instructions may reside completely, or at least partially, within the memory 106, the medium reader 112, and/or the processor 104 (see FIG. 1) during execution by the SSRD 402.

According to exemplary embodiments, the instructions, when executed, may cause a processor embedded within the SSRM 406 or the SSRD 402 to perform the following: establishing a communication link between a plurality of service providers and one or more processors embedded within the smart secret rotator module via a communication interface, wherein each of said plurality of service providers generates corresponding secret or credential to be utilized by an application for connecting to said service; running the smart secret rotator module in a preconfigured time interval to determine whether the secret or the credential corresponding to each service provider has been changed during the preconfigured time interval; calling, by the smart secret rotator module, a first API, in response to determining that the secret or the credential corresponding to each service provider has been changed, to retrieve the changed secret or the credential from the corresponding service provider; storing the changed secret or the credential to a corresponding predefined location; calling, by the application, a second API to retrieve the changed secret or the credential from the corresponding predefined location; and automatically establishing a connection between the application and the corresponding service provider based on a determination that the changed secret or the credential retrieved from the predefined location matches with the changed secret or the credential retrieved from the corresponding service provider during the preconfigured time interval. According to exemplary embodiments, the processor may be the same or similar to the processor 104 as illustrated in FIG. 1 or the processor embedded within SSRD 202, SSRD 302, SSRD 402, and SSRM 406.

According to exemplary embodiments, when a cloud service is enabled with secret rotation while provisioning, the instructions, when executed, may further cause the processor 104 to perform the following: transmitting those rotation notifications to the smart secret rotator module via lambda functions; and updating the corresponding predefined location with the secrets accordingly.

According to exemplary embodiments, when a cloud service is enabled with secret rotation while provisioning, the instructions, when executed, may further cause the processor 104 to perform the following: transmitting those rotation notifications to the smart secret rotator module via lambda functions; and updating the corresponding predefined location with the secrets accordingly.

According to exemplary embodiments as disclosed above in FIGS. 1-7, technical improvements effected by the instant disclosure may include a platform for implementing a platform, language, and cloud agnostic smart secret rotator module configured to be run on a scheduler module to retrieve secrets, tokens, passwords, and/or other credentials from different sources and write them to a destination from where applications may read them to connect to various services, but the disclosure is not limited thereto. According to exemplary embodiments as disclosed above in FIGS. 1-7, technical improvements effected by the instant disclosure may include a platform for implementing a platform, language, and cloud agnostic smart secret rotator module configured to provide: seamless integration with vendor products which does not support AWS Secrets manager; rotate secrets, tokens, passwords, and/or other credentials on a scheduled manner; speed up AWS deployments; and save developing hours for vendors, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a smart secret rotator module configured to programmatically generate and rotate secrets or credentials for applications to read them to connect to various services by utilizing one or more processors along with allocated memory, the method comprising:

establishing a communication link between a plurality of service providers and one or more processors embedded within the smart secret rotator module via a communication interface, wherein each of said plurality of service providers generates corresponding secret or credential to be utilized by an application for connecting to said service;

running the smart secret rotator module in a preconfigured time interval to determine whether the secret or the credential corresponding to each service provider has been changed during the preconfigured time interval;

calling, by the smart secret rotator module, a first application programming interface (API), in response to determining that the secret or the credential corresponding to each service provider has been changed, to retrieve the changed secret or the credential from the corresponding service provider;

storing the changed secret or the credential to a corresponding predefined location;

calling, by the application, a second API to retrieve the changed secret or the credential from the corresponding predefined location; and automatically establishing a connection between the application and the corresponding service provider based on a determination that the changed secret or the credential retrieved from the predefined location matches with the changed secret or the credential retrieved from the corresponding service provider during the preconfigured time interval.

2. The method according to claim 1, wherein the plurality of services include one or more of the following: a private or a public cloud provider; an active directory federation service configured to provide a user with a single sign-on access to systems and applications located across organizational boundaries; and a password vault configured to store usernames and passwords for multiple applications securely, and in an encrypted format.

3. The method according to claim 2, wherein the private cloud provider includes one or more of the following: private cloud secret manager and private cloud key vault.

4. The method according to claim 1, wherein the preconfigured time interval includes five minutes, or ten minutes, or fifteen minutes, or twenty minutes.

5. The method according to claim 1, wherein the predefined location includes one or more of the following: open source software management platform secret; configuration files; a centralized memory; and a centralized database.

6. The method according to claim 1, wherein the secret or the credential includes one or more of the following: secret keys, access codes, authorization tokens, and passwords.

7. The method according to claim 6, wherein the smart secret rotator module is configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

8. The method according to claim 1, wherein, when a cloud service is enabled with secret rotation while provisioning, the method further comprising:
   transmitting those rotation notifications to the smart secret rotator module via lambda functions; and
   updating the corresponding predefined location with the secrets accordingly.

9. A system for implementing a smart secret rotator module configured to programmatically generate and rotate secrets or credentials for applications to read them to connect to various services, the system comprising:
   a processor; and
   a memory operatively connected to the processor via a communication interface, the memory storing computer readable instructions, when executed, causes the processor to:
   establish a communication link between a plurality of service providers and one or more processors embedded within the smart secret rotator module via a communication interface, wherein each of said plurality of service providers generates corresponding secret or credential to be utilized by an application for connecting to said service;
   run the smart secret rotator module in a preconfigured time interval to determine whether the secret or the credential corresponding to each service provider has been changed during the preconfigured time interval;
   call, by the smart secret rotator module, a first application programming interface (API), in response to determining that the secret or the credential corresponding to each service provider has been changed, to retrieve the changed secret or the credential from the corresponding service provider;
   store the changed secret or the credential to a corresponding predefined location;
   call, by the application, a second API to retrieve the changed secret or the credential from the corresponding predefined location; and
   automatically establish a connection between the application and the corresponding service provider based on a determination that the changed secret or the credential retrieved from the predefined location matches with the changed secret or the credential retrieved from the corresponding service provider during the preconfigured time interval.

10. The system according to claim 9, wherein the plurality of services include one or more of the following: a private or a public cloud provider; an active directory federation service configured to provide a user with a single sign-on access to systems and applications located across organizational boundaries; and a password vault configured to store usernames and passwords for multiple applications securely, and in an encrypted format.

11. The system according to claim 10, wherein the private cloud provider includes one or more of the following: private cloud secret manager and private cloud key vault.

12. The system according to claim 9, wherein the preconfigured time interval includes five minutes, or ten minutes, or fifteen minutes, or twenty minutes.

13. The system according to claim 9, wherein the predefined location includes one or more of the following: open source software management platform secret; configuration files; a centralized memory; and a centralized database.

14. The system according to claim 9, wherein the secret or the credential includes one or more of the following: secret keys, access codes, authorization tokens, and passwords.

15. The system according to claim 14, wherein the smart secret rotator module is configured as a reusable component which can be deployed to any cloud platform to retrieve the secret keys, the access codes, the authorization tokens, and the passwords and write the secret keys, the access codes, the authorization tokens, and the passwords to a corresponding destination from where the application can read them to connect to the various services.

16. The system according to claim 9, wherein, when a cloud service is enabled with secret rotation while provisioning, the processor is further configured to:
   transmit those rotation notifications to the smart secret rotator module via lambda functions; and
   update the corresponding predefined location with the secrets accordingly.

17. A non-transitory computer readable medium configured to store instructions for implementing a smart secret rotator module configured to programmatically generate and rotate secrets or credentials for applications to read them to connect to various services, the instructions, when executed, cause a processor to perform the following:
   establishing a communication link between a plurality of service providers and one or more processors embedded within the smart secret rotator module via a communication interface, wherein each of said plurality of service providers generates corresponding secret or credential to be utilized by an application for connecting to said service;
   running the smart secret rotator module in a preconfigured time interval to determine whether the secret or the credential corresponding to each service provider has been changed during the preconfigured time interval;
   calling, by the smart secret rotator module, a first application programming interface (API), in response to determining that the secret or the credential corresponding to each service provider has been changed, to retrieve the changed secret or the credential from the corresponding service provider;
   storing the changed secret or the credential to a corresponding predefined location;
   calling, by the application, a second API to retrieve the changed secret or the credential from the corresponding predefined location; and
   automatically establishing a connection between the application and the corresponding service provider based on a determination that the changed secret or the credential retrieved from the predefined location matches with the changed secret or the credential retrieved from the corresponding service provider during the preconfigured time interval.

18. The non-transitory computer readable medium according to claim 17, wherein the plurality of services include one or more of the following: a private or a public cloud provider; an active directory federation service configured to provide a user with a single sign-on access to systems and applications located across organizational boundaries; and a password vault configured to store usernames and passwords for multiple applications securely, and in an encrypted format.

19. The non-transitory computer readable medium according to claim 17, wherein the preconfigured time interval includes five minutes, or ten minutes, or fifteen minutes, or twenty minutes.

20. The non-transitory computer readable medium according to claim 17, wherein, when a cloud service is enabled with secret rotation while provisioning, the instructions, when executed, further cause the processor to perform the following:
  transmitting those rotation notifications to the smart secret rotator module via lambda functions; and
  updating the corresponding predefined location with the secrets accordingly.

\* \* \* \* \*